(12) United States Patent
Malavasi (10) Patent No.: US 12,234,798 B2
(45) Date of Patent: Feb. 25, 2025

(54) ENERGY RECOVERY VALVE SYSTEM WITH LATERAL FLOW VALVE FOR CONTROLLING THE FLUID FLOW IN A DUCT

(71) Applicant: Politecnico di Milano, Milan (IT)

(72) Inventor: Stefano Malavasi, Milan (IT)

(73) Assignee: Politecnico Di Milano, Milan (IT)

( * ) Notice: Subject to any disclaimer, the term of this patent is extended or adjusted under 35 U.S.C. 154(b) by 7 days.

(21) Appl. No.: 18/002,772

(22) PCT Filed: Jun. 18, 2021

(86) PCT No.: PCT/IB2021/055386
§ 371 (c)(1),
(2) Date: Dec. 21, 2022

(87) PCT Pub. No.: WO2021/260509
PCT Pub. Date: Dec. 30, 2021

(65) Prior Publication Data
US 2023/0287859 A1    Sep. 14, 2023

(30) Foreign Application Priority Data
Jun. 23, 2020 (IT) .................... 102020000015013

(51) Int. Cl.
*F03B 13/08* (2006.01)
*F03B 11/00* (2006.01)

(52) U.S. Cl.
CPC ............ *F03B 13/08* (2013.01); *F03B 11/004* (2013.01)

(58) Field of Classification Search
CPC ................................ F03B 13/08; F03B 11/004
See application file for complete search history.

(56) References Cited

U.S. PATENT DOCUMENTS

| | | | |
|---|---|---|---|
| 2014/0346776 A1* | 11/2014 | Park | F01D 15/10 290/52 |
| 2022/0317709 A1* | 10/2022 | Ham | F03B 17/06 |

FOREIGN PATENT DOCUMENTS

| | | |
|---|---|---|
| KR | 102 088 879 B1 | 3/2020 |
| WO | 2013/121375 A1 | 8/2013 |

OTHER PUBLICATIONS

International Search Report and Written Opinion dated Nov. 8, 2021, issued in PCT Application No. PCT/IB2021/055386, filed Jun. 18, 2021.

* cited by examiner

*Primary Examiner* — Eldon T Brockman
(74) *Attorney, Agent, or Firm* — Workman Nydegger (57) ABSTRACT

A valve system for controlling the fluid flow in a duct, includes: a valve body adapted to be inserted in an interruption of the duct, and provided with an inlet and an outlet for a flow of fluid in the duct, a lateral flow valve, developing substantially transversally in the duct, placed in the valve body upstream of the fluid flow, the valve having an obstructer capable of moving transversally in the duct to "laterally" interrupt part of the fluid flow in the duct, an actuator adapted to move the obstructer from a first position, in which the duct is fully open, to a second position, in which the duct is fully closed, a rotor shaped substantially as a turbine, placed inside the valve body downstream of the valve with respect to the fluid flow, the rotor being located at a distance from the valve comprised within a pressure recovery zone, the pressure being generated by the valve in the absence of the turbine.

9 Claims, 6 Drawing Sheets

ENERGY RECOVERY VALVE SYSTEM WITH LATERAL FLOW VALVE FOR CONTROLLING THE FLUID FLOW IN A DUCT

FIELD OF THE INVENTION

The present invention relates to an energy recovery valve system with valve of the lateral flow type for controlling the fluid flow in a duct.

BACKGROUND ART

Several types of valves for controlling the fluid flow in a duct are known in the art, which are used as shut-off devices within ducts, typically pressurized ones.

These valves allow for selectively closing the duct with which they are associated, in order to control the flow of a fluid, whether a compressible one, such as gas or steam, or an incompressible one, such as a liquid. To this end, the valves known in the art comprise an obstructer having an appropriate shape, housed in a suitable seat within the duct.

In particular, gate valves are known, i.e. valves developing in a substantially transversal direction within the duct: the gate moves transversally in the duct, thereby stopping part of the fluid flow "laterally" in the duct, meaning that the fluid can only flow in the lateral part of the duct that has been left open by the gate.

The flow adjustment effectiveness of said known valves is nevertheless poor. The adjustment of the flow through the valve is inaccurate, and it is difficult to precisely determine the quantity of fluid actually flowing through a partially closed valve. Moreover, the latter, when partially closed in order to adjust the flow of a fluid, introduces huge local dissipations of energy within the fluid itself, which energy is substantially lost. Such dissipations lead to a reduction in the energy associated with the fluid, resulting in a reduced flow rate and/or pressure of the fluid. Typically, such dissipations bring no energetic benefit to the system in which the valve is inserted.

SUMMARY OF THE INVENTION

It is therefore an object of the present invention to propose an energy recovery valve system with valve of the lateral flow type for controlling the fluid flow in a duct, which represents an improvement over the prior art.

The present invention relates to a valve system for controlling the fluid flow in a duct, which comprises a valve body enclosing a lateral flow valve and a rotor shaped substantially as a turbine, hereafter referred to as either rotor or turbine, which permits recovering part of the energy that control valves dissipate during their control action, and that would otherwise be dissipated and lost.

The turbine is positioned downstream of the valve, with reference to the fluid flow, in a position characterized by the presence of the contracted vein ahead of the valve.

The turbine positioning area is determined by the upstream valve and by the section where the pressure is fully restored downstream of the valve; this area may indicatively be defined within a range of 5-6 pipe diameters and also affects the valve opening and the fluid-dynamic conditions.

The axis of rotation of the turbine is preferably perpendicular to the flow and to the closing direction of the obstructer, lying in a plane parallel to the valve closing direction at a variable height depending on the shape of the gate/obstructer.

Furthermore, the turbine may be completely contained within a suitable seat of the valve body, the size of which equals that of the downstream duct, or it may require a differently sized seat, depending on the application and on the permissible outer dimensions.

The valve body may be made as one piece, containing both the valve and the turbine, or it may be divided into at least two parts, one containing the valve and the other containing the turbine.

Within the frame of the present invention, the term "valve of the lateral flow type" comprises various types of valves developing substantially transversally in the duct, comprising an obstructer capable of moving in a substantially transversal direction in the duct to "laterally" interrupt part of the fluid flow within the duct itself, meaning that the fluid can only flow in the lateral part of the duct that has been left open by the obstructer. In some non-limiting examples, said valves are of the guillotine or gate type.

The present invention concerns a valve system for controlling the fluid flow in a duct, comprising:
- a valve body adapted to be inserted in an interruption of said duct, and provided with an inlet and an outlet for a flow of fluid in said duct,
- a valve of the lateral flow type, developing substantially transversally in the duct, placed in said valve body upstream of the fluid flow, said valve comprising an obstructer capable of moving transversally in said duct to "laterally" interrupt part of the fluid flow in said duct,
- actuation means adapted to move said obstructer from a first position, in which said duct is fully open, to a second position, in which said duct is fully closed,
- a rotor shaped substantially as a turbine, placed inside the valve body downstream of said valve with respect to the fluid flow, said rotor being located at a distance from said valve comprised within a pressure recovery zone, said pressure being generated by said valve in the absence of the turbine, said distance being defined by the reaching of the tract with a straight piezometric line and a constant pressure angle downstream of said valve.

It is a particular object of the present invention to provide an energy recovery valve system with lateral flow valve for controlling the fluid flow in a duct as set out in the claims, which are an integral part of the present description.

BRIEF DESCRIPTION OF THE DRAWINGS

Further objects and advantages of the present invention will become apparent from the following detailed description of an exemplary embodiment (and variants thereof) provided herein with reference to the annexed drawings, which are only supplied by way of non-limiting example, wherein.

In the drawings, the same reference numerals and letters identify the same items or components.

DETAILED DESCRIPTION OF SOME EMBODIMENTS

Figure 1:
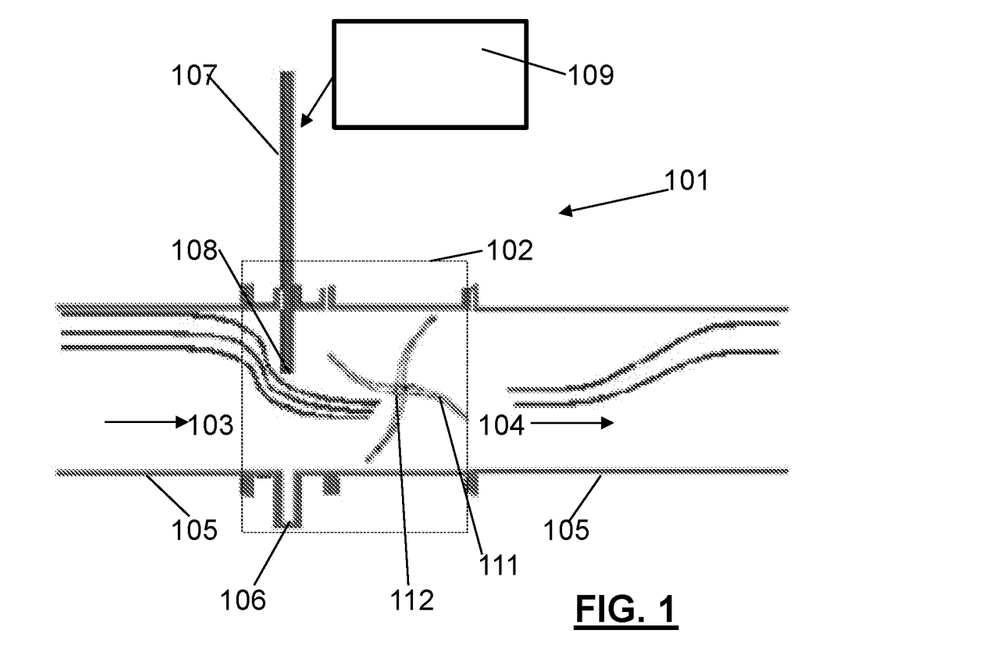
FIGS. 1 and 2 schematically show a first variant of the valve system of the present invention in partially open and closed configurations, respectively.

FIG. 1 shows a schematic view of a valve system 101 according to the present invention. The valve system 101 comprises a valve body 102 provided with an inlet 103 and an outlet 104, which allow a fluid to flow in a duct 105. In operating conditions, the valve system 101 can be mounted at a suitable interruption of the duct 105 included, for example, in a pressurized system.

The valve system 101 comprises, in the body 102, a valve 106 with an obstructer 107, positioned upstream in the duct with respect to the direction of the fluid flow, and a rotor (or turbine) 111 positioned downstream of the valve with respect to the direction of the fluid flow.

The valve body 102 is inserted, in a per se known manner, into a suitable interruption of the duct, and is coupled thereto by means of, for example, flanges or another per se known system.

As aforesaid, the valve 106 is a valve of the "lateral flow" type developing substantially transversally in the duct, and comprises an obstructer 107 capable of moving transversally in the duct to "laterally" interrupt part of the fluid flow in said duct, meaning that the fluid can only flow in the lateral part of the duct that has been left open by the obstructer (see, for example, the fluid flow lines in FIG. 1).

The valve is of a per se known type: it may be a normal gate valve (inexpensive solution), e.g. a flat gate valve, shaped as a blade or a crescent (with a linear or curved blade profile), or even a ball or half-ball valve. The obstructer may be, for example, of the gate and/or guillotine type. Other shapes of the "lateral flow" valve type are possible as well.

The obstructer 107 is connected to an actuator 109 that controls its movement as it is totally or partially opened or closed. The actuator may be a mechanical one, e.g. a knob operable by a user, or else a pneumatic or electromechanical one, and can be made in a per se known manner.

The obstructer 107 is such as to ensure fluid tightness in the duct in any obstructer position and for any fluid type. In order to achieve said tightness, known elements and techniques can be used.

The valve system 101 further comprises a rotor shaped substantially as a turbine 111 fixed to a shaft 112, whereon it is adapted to rotate.

The turbine 111 is adapted to rotate under the action of the fluid flowing through the valve 101 as will be described more in detail hereinafter.

The axis of rotation 112 of the turbine is perpendicular to the flow and to the closing direction of the obstructer 107, lying in a plane parallel to the valve closing direction at a variable height depending on the shape of the valve.

Figure 3:
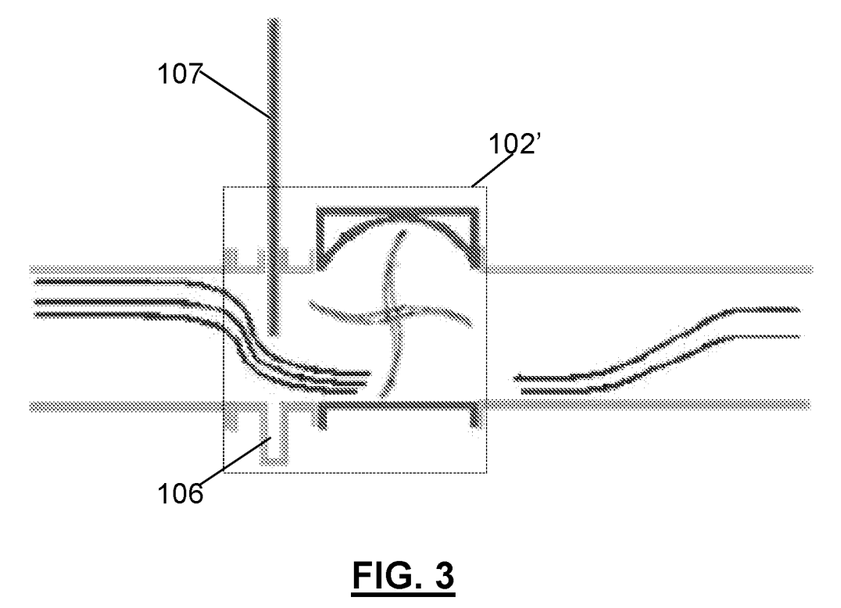
FIGS. 3 and 4 schematically show a second variant of the valve system of the present invention in partially open and closed configurations, respectively.

The axis of rotation thus arranged permits a better exploitation of the fluid recirculation generated downstream of the valve. The elevation of the axis of rotation with respect to the pipe axis should be chosen as a function of the most frequent operating conditions of the system. In particular, if the valve has to remain longer open by a percentage equal to or smaller than 50% of its travel, a solution should preferably be adopted wherein the elevation of the rotor is the same as that of the duct axis, which permits accommodating the turbine in a section having the same diameter as the pipe (FIG. 1); conversely, if the valve has to remain longer open by a percentage in excess of 50% of its travel, a solution should preferably be adopted wherein the elevation of the rotor is higher than that of the duct axis, so that the section of the turbine housing will be greater than the pipe diameter (FIG. 3).

The selection of a turbine with an axis perpendicular to the main direction of the flow and to the closing direction of the obstructer 107 is essential to ensure the proper operation of the system when adjusting the flow, i.e. when the valve is partially open. In fact, in addition to adjusting the flow, in this solution the valve also acts as a conveyor for directing the flow towards the turbine blades.

Furthermore, the installation of the system immediately downstream of the valve, and more precisely in the region where the fluid undergoes maximum acceleration (contracted section) and energy recovery occurs, permits recovering part of the energy that the control valve dissipates in order to control the fluid, by better exploiting the energy recovery potential of the system described herein.

FIG. 1 schematically shows the valve system 101 in a partially open configuration, wherein it allows the fluid to pass at a rate that depends on the aperture of the obstructer 107.

Figure 2:
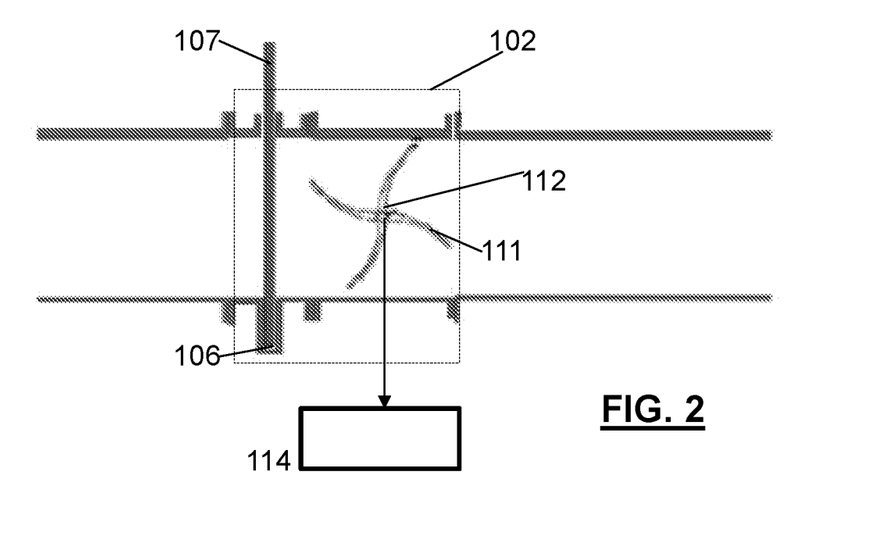

FIG. 2 schematically shows the valve system 101 in the closed configuration, wherein it substantially prevents the fluid from flowing through the valve. Since no fluid can reach the rotor 111, the latter will remain still and no power will be generated.

As described above, the position of the turbine downstream of the valve must be comprised within the pressure recovery zone, said pressure being generated by the valve in the absence of the turbine, and is generally in the range of 5-6 diameters of the pipe downstream of the valve. This zone can be identified by means of pressure measurements taken downstream of the valve, which will give, on average, a qualitative trend of the piezometric line similar to the one shown in FIG. 5. The distance in question is defined by the reaching of the tract with a straight piezometric line and a constant pressure angle downstream of the valve, typically of a constant-diameter straight pipe. Such distance may vary depending on the valve aperture and the flow conditions, and anyway it can be assumed that, on average, the point where the valve achieves full pressure recovery is located at a distance of 5-6 pipe diameters downstream of the valve.

Figure 5:
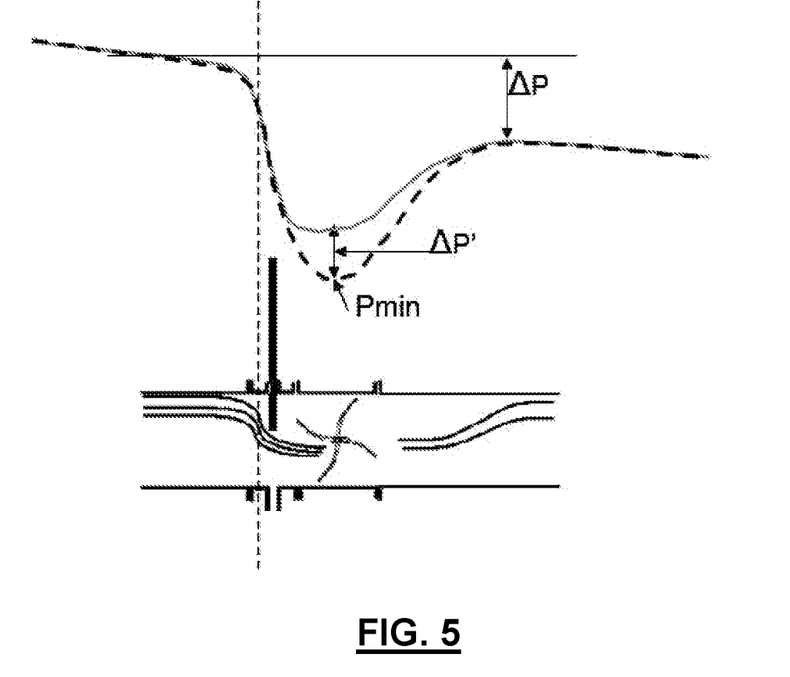
FIG. 5 shows the qualitative trends of the average piezometric lines of the fluid flow at a generic gate valve (dashed line) and at the same valve with the energy recovery system of the present invention positioned downstream of it (continuous line)

More in particular, FIG. 5 schematically highlights the fluid flow lines and the fluid pressure trend in the duct 105 at the valve system. As described above, the trend of the fluid flow lines varies as a function of the degree of closure of the valve 106, the flow lines getting compressed on the side left open by the valve, near the latter, and then expanding downstream of it.

As regards the trend of the fluid pressure (FIG. 5), at the valve 106 the pressure decreases to a minimum $P_{min}$ downstream of the valve and the velocity of the fluid increases. Further downstream, the pressure is gradually restored to a linear pressure trend. The dashed line represents the pressure trend in the absence of the turbine, while the continuous line represents the same average trend in the presence of the turbine. The difference between the minimum pressures reached ($\Delta P'$) schematically represents the amount of energy that the turbine can recover without significantly affecting the total energy dissipated during the control action, schematically represented by the pressure drop ($\Delta P$) imposed by the valve to adjust the flow (in this case, the pressure).

Advantageously and preferably, the turbine is positioned in the zone of minimum pressure. A part of the energy ΔP' (obtained in the minimum zone $P_{min}$) is recovered by the turbine, while the downstream ΔP value remains unchanged.

Therefore, the downstream ΔP value (pressure drop) to be obtained by appropriately sizing the valve must be determined first, e.g. by assuming a certain degree of closure of the valve and a certain fluid pressure value. By inserting the turbine at the point of minimum pressure (maximum velocity), the turbine will be able to recover an energy part corresponding to ΔP', i.e. the difference between the minimum pressures, which would otherwise be lost, independently of the turbine speed, while keeping the downstream ΔP value unchanged.

The dimensions of the part of the valve body that comprises the turbine may be independent of, i.e. either equal to or different from, those of the valve part, thus allowing a broad variety of construction variants, even as concerns the dimensions of the turbine.

Figure 4:
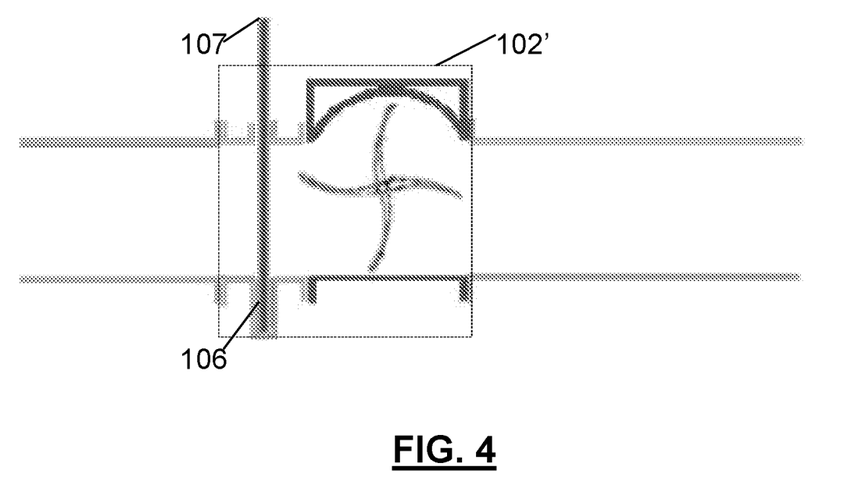

FIGS. 3 and 4 show a variant of the valve system with the valve 106 partially open and closed, respectively, wherein the part of the valve body 102' that comprises the turbine is bigger than the part of the valve body that comprises the valve. As a consequence, also the turbine can be bigger. In addition, the turbine axis can be offset relative to the central axis of the duct. Advantageously, it can be raised on the side where the valve gate is engaged. In this manner, when the valve is fully open the turbine will offer less resistance to the fluid flow, in addition to allowing a more efficient energy generation.

Figure 6:
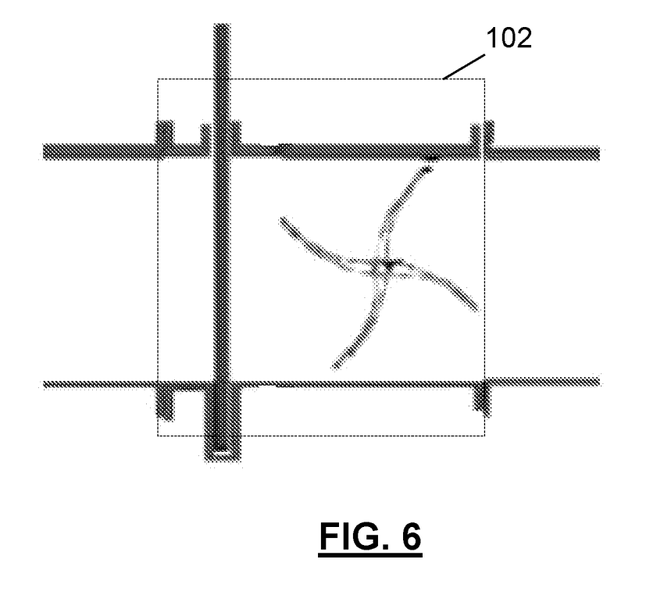
FIGS. 6 and 7 schematically show first and second variant embodiments of the valve body of the valve system according to the present invention.
Figure 7:
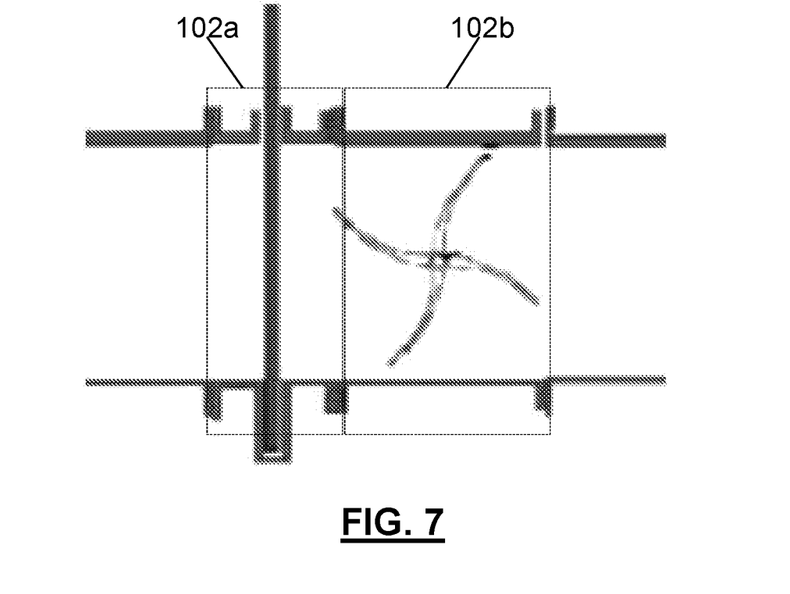

With reference to FIGS. 6 and 7, further variants of the valve body 102 are also possible. It may be made as one piece (102, FIG. 6) comprising both the valve and the turbine. Or, alternatively, it may be made up of two distinct parts (102a, 102b, FIG. 7) connected together, wherein one part comprises the valve and the other part comprises the turbine.

It is thus possible to make a new valve incorporating the turbine or to provide an "add-on" for an existing valve. In this latter case, considerable advantages are attained for a number of applications wherein the valve type cannot be changed, thus giving the possibility of simply inserting the turbine, which in this case will be an "add-on" to an existing valve, which will become integrated with it and make it usable for different purposes. In addition to extending the number of valve types capable of recovering energy, it will also extend the possibility of energy recovery in fluid-dynamic processes.

The shaft 112 has one end protruding from the valve body 102. The protruding end of the shaft 112 is preferably connected to a user apparatus 114. The user apparatus 114 is adapted to use the mechanical power supplied by the shaft 112 due to the rotation of the rotor 111.

The user apparatus 114 may therefore be an electric generator, or a mechanical apparatus such as, for example, a fan. The user apparatus 114 may further comprise known transmission couplings or reducers, not shown for the sake of simplicity.

Figure 12:
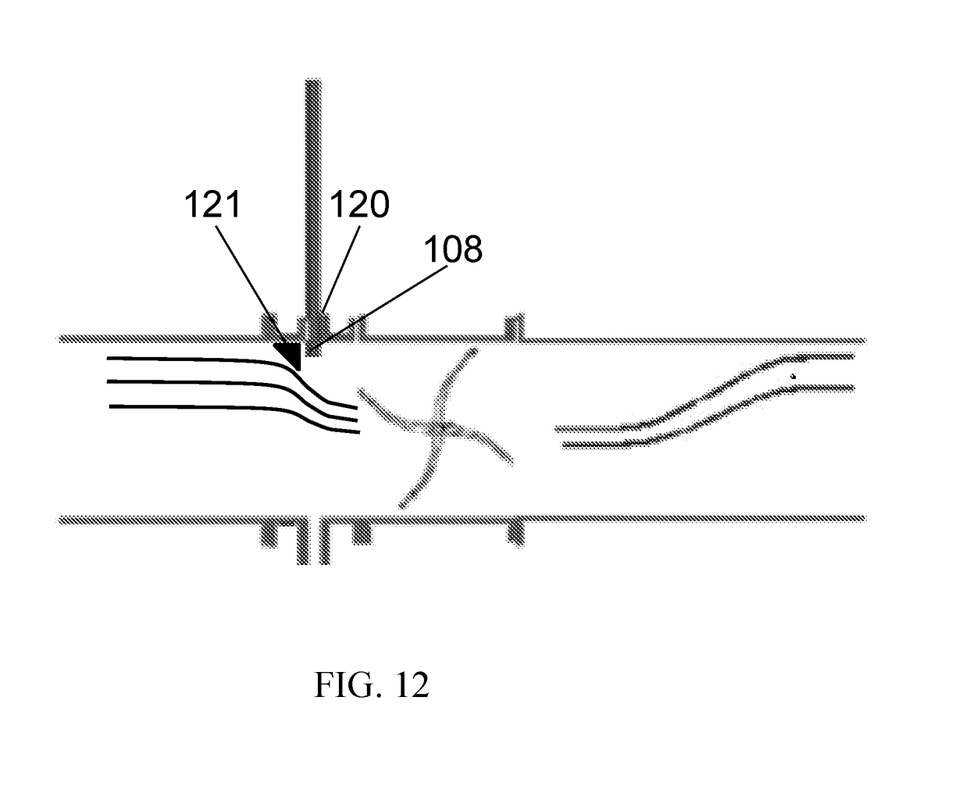
FIG. 12 shows a further variant comprising a fluid flow deflector upstream of the valve.

Depending on the various operating conditions, a deflector 121 may be included upstream of the valve, inserted on the engagement side 120 of the valve obstructer (FIG. 12). The deflector may be a simple plate anchored and welded to a support, or it may have more aero-fluid-dynamically efficient shapes. The deflector contributes to preventing any dissipations concentrated at the edge 108 of the gate. This will increase the energy production capability when the valve is fully open or almost fully open.

A valve system according to the present invention may comprise a rotor shaped substantially as a turbine and made in accordance with different manufacturing solutions, which will essentially depend on the type of application of the valve itself.

The construction of the rotor will primarily depend on the type of fluid for which the valve is to be optimized, whether gas, liquid, steam or any other multi-phase fluid.

Such diversification is also related to specific liquid types, e.g. for liquids having different viscosity or density. For example, different characteristics, such as a higher flow coefficient, will be required from the valve for working with oil as opposed to water, so as to obtain an increased flow rate; also, the rotor blades will have to be self-cleaning.

Figure 8:
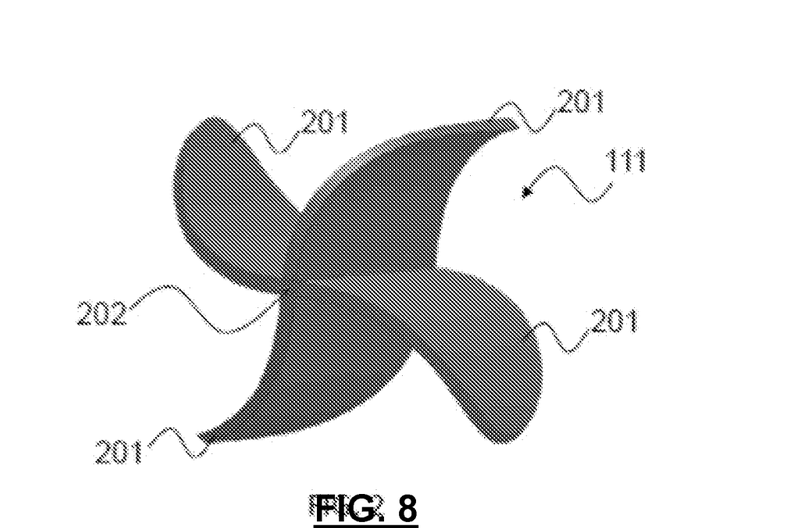
FIGS. 8-11 show some variant embodiments of the turbine of the valve system according to the present invention.

FIG. 8 illustrates one possible embodiment of the rotor 111, mounted to the shaft 112. The rotor 111 comprises four blades 201 which, under the action of the fluid flow passing through the valve 101, are adapted to rotate and produce a torque that will drive the shaft 111.

Preferably, the blades of the rotor 111 are curved towards the fluid inlet direction, thus improving the efficiency and facilitating the starting of the rotor. Moreover, preferably, the blades of the rotor 111 are so sized as to occupy as much as possible of the section of the duct.

Figure 9:
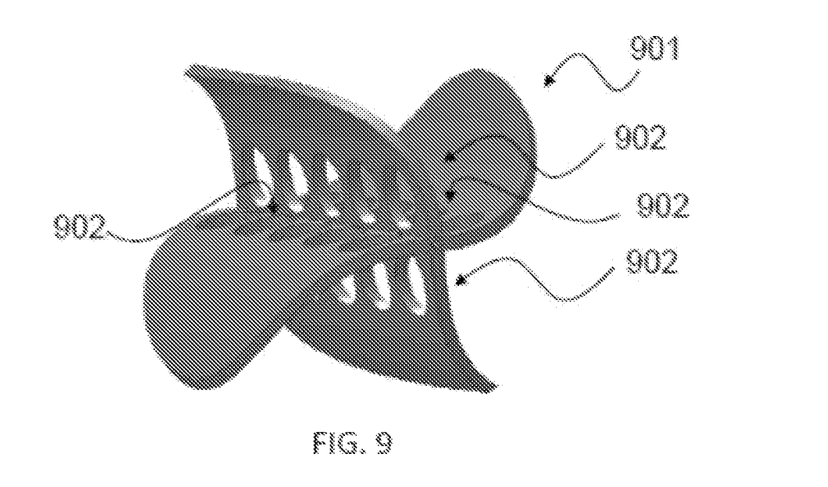

FIG. 9 shows a further embodiment of a rotor 901 which may be used in a control valve according to the present invention. In this variant, the rotor 901 comprises four blades that, under the action of the fluid flowing through the valve, are adapted to rotate and produce a torque that will drive the shaft 112.

The rotor 901 comprises a plurality of holes 902, which increase the flow passage surface and the flow coefficient of the fluid.

The holes 902 are preferably located in the proximity of the axis of rotation of the rotor 902, so that the outermost portions of the blades, i.e. where the lever arm is longest, will still be working, thus producing more power.

Other variants of the rotor are also conceivable, which essentially differ from one another in the number and shape of the blades.

Figure 10:
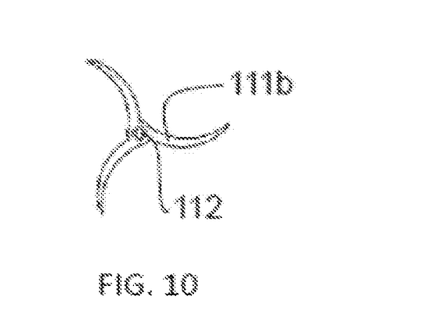

FIG. 10 schematically shows a valve 101b comprising a rotor 111b comprising three blades, which is preferably adapted for use with very viscous liquids.

Figure 11:
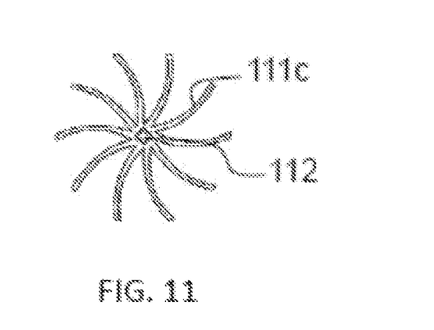

FIG. 11 schematically shows a valve 101c comprising a rotor 111c comprising ten blades, which is preferably adapted for use with gases.

The blades may also be flat, e.g. should such choice be dictated by production cost requirements.

A valve system according to the present invention permits, therefore, recovering at least part of the energy dissipated by the fluid flowing therethrough. The energy recovered will depend on the valve opening angle, i.e. the angle of rotation of the obstructer, and on the efficiency of the turbine.

The above-described non-limiting examples may be subject to further variations without however departing from the protection scope of the present invention, including all equivalent embodiments known to a person skilled in the art.

The elements and features shown in the various preferred embodiments may be combined together without however departing from the protection scope of the present invention.

From the above description, those skilled in the art will be able to produce the object of the invention without introducing any further construction details.

The invention claimed is:

1. A valve system for controlling a fluid flow in a duct, comprising:

a valve body adapted to be inserted in an interruption of said duct, and provided with an inlet and an outlet for the fluid flow in said duct, a lateral flow valve, developing substantially transversally in the duct, placed in said valve body upstream of the fluid flow, said lateral flow valve comprising an obstructer capable of moving transversally in said duct to laterally interrupt part of the fluid flow in said duct, an actuator adapted to move said obstructer from a first position, in which said duct is fully open, to a second position, in which said duct is fully closed, a rotor shaped substantially as a turbine, placed inside the valve body downstream of said obstructer with respect to the fluid flow, said rotor being located at a distance from said obstructer comprised within a pressure recovery zone, said distance being in a range between five to six times a diameter of the duct downstream of said lateral flow valve, wherein said rotor is provided with a rotation shaft having a plurality of rotor blades outwardly extending therefrom that are disposed within the valve body, the rotation shaft being perpendicular to the fluid flow in the duct and to the closing direction of said obstructer.

2. The valve system as in claim 1, wherein said lateral flow valve is a flat gate valve, shaped as a blade, or as a crescent with a linear or curved blade profile, or as a ball or half-ball valve.

3. The valve system as in claim 1, wherein said obstructer is of the gate and/or guillotine type.

4. The valve system as in claim 1, wherein said rotation shaft of the rotor comes out of said valve body and is adapted to be connected to a user apparatus utilizing the rotation energy of the rotor.

5. The valve system as in claim 1, wherein said rotor is placed at a point of minimum pressure value within said pressure recovery zone.

6. The valve system for controlling the fluid flow in a duct as in claim 1, wherein the plurality of rotor blades are substantially transversal to the passing fluid flow.

7. The valve system as in claim 6, wherein said rotor blades are curved towards a direction of admission of the fluid flow into the valve system.

8. The valve system as in claim 1, wherein said valve body is made as one piece, or else is made up of two distinct parts connected together, a first part comprising said valve and a second part comprising said rotor, wherein the dimensions of said second part may differ from those of said first part.

9. The valve system as in claim 1, further comprising a deflecting element positioned upstream of said valve in a region where the obstructer is engaged, said deflecting element being adapted to fluid-dynamically interact with a flow of said fluid.

* * * * *